No. 695,571. Patented Mar. 18, 1902.
F. L. LORDEN.
MACHINE FOR CUTTING TOBACCO.
(Application filed July 15, 1901.)
(No Model.)

Attest:
[signatures]
Edw. L. Reed.

Inventor:
Frederick L. Lorden,
by Richards &
Attys

UNITED STATES PATENT OFFICE.

FREDERICK LAMBERT LORDEN, OF WELLINGTON, NEW ZEALAND.

MACHINE FOR CUTTING TOBACCO.

SPECIFICATION forming part of Letters Patent No. 695,571, dated March 18, 1902.

Application filed July 15, 1901. Serial No. 68,418. (No model.)

*To all whom it may concern:*

Be it known that I, FREDERICK LAMBERT LORDEN, draftsman, of Wellington, New Zealand, have invented certain new and useful Improvements in Machines for Cutting Tobacco; and I do hereby declare that the following is a full, clear, and exact description of the same.

The object of my invention is to provide a simple and effective machine wherewith cake-tobacco may be rapidly cut into slices of even thickness.

The accompanying drawings illustrate my tobacco-cutter, though I do not confine myself to the precise details shown thereon.

Figure 1:
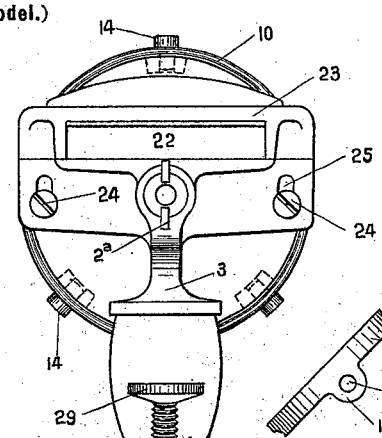
Figure 5:
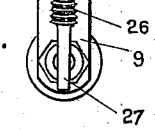
Figure 2:
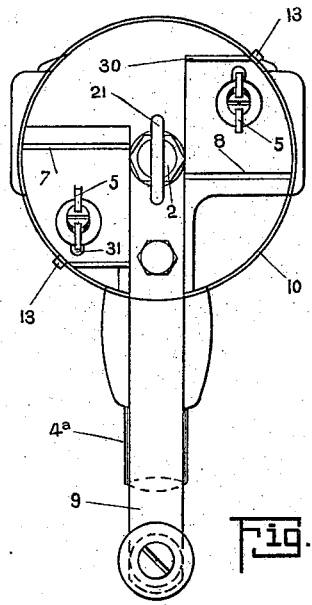
Figure 3:
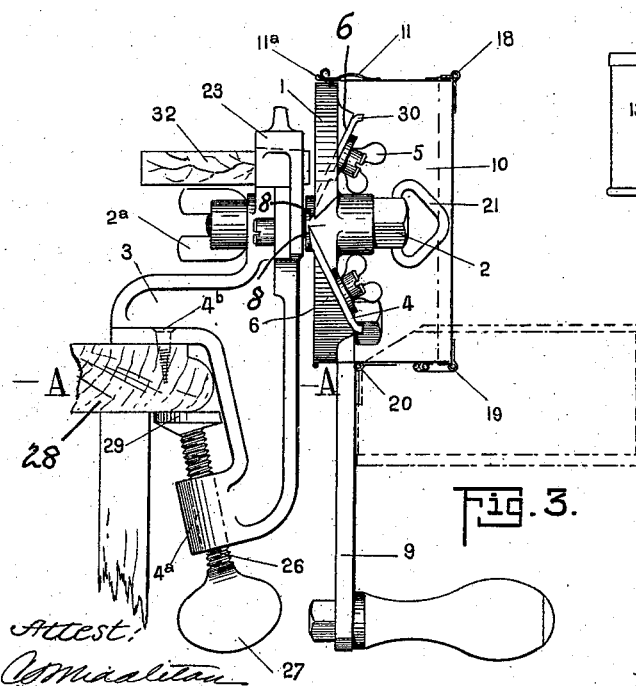
Figure 4:
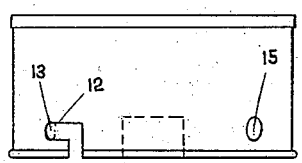
Figure 6:
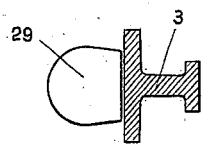

Figure 1 is an elevation of the back of the cutter. Fig. 2 is a front view of the same with the receiving-box removed. Fig. 3 is a side view of the same with the receiving-box in section. Fig. 4 is a side view of the receiving-box. Fig. 5 is a view of the lug. Fig. 6 is a section of the cramp on line A A, Fig. 3.

Similar figures of reference indicate similar parts.

My machine comprises a disk 1, mounted revolubly on the pin or stud 2, which is screwed into the bracket 3 and locked by the nut $2^a$. 4 represents knives secured to the disk 1 by the wing-nuts 5 upon the sloping faces 6, formed on the disk. The front of the knives pass through slots 7 in the disk and their cutting edges 8 project beyond the face of the disk. The handle 9 is secured to or made solid with the disk, and the receiving-box 10 is secured to the disk by a spring-catch 11, having a point $11^a$, taking into an indentation formed in the periphery of the disk, or it is secured by bayonet-joints 12, Fig. 4, in which case studs 13 are fixed in the disk and project from its periphery, or by screws 14 passing through the holes 15 and taking into holes 16 in the lugs 17, formed on the disk. In this latter case I hinge the back of the box by a hinge 18 and provide a fastening 19. When the spring 11 is used, I hinge the box by a hinge 20 to the handle 9 or other convenient part, and I cut away a portion of the rim of the box near the joint, as shown by the dotted lines on Fig. 3, to allow the box to close upon the disk.

21 is a loop or its equivalent attached to the head of the pin 2, whereby the said pin may be held from turning while locking it with the wing-nut $2^a$. By screwing the pin 2 into the bracket 3 the disk can be adjusted with the greatest accuracy to revolve without play, and it is then firmly secured by the nut $2^a$.

The upper part of the bracket 3 is provided with a mouthpiece 22, the upper part 23 of which is adjustable vertically by means of its screws 24 taking into slots 25 in the bracket. The mouthpiece is placed centrally with respect to the disk, as shown in Fig. 1. The tobacco bears against the upper part of the mouthpiece during the upward cut of the knives and against the lower part during the downward stroke of the knives. The lower part of the bracket is formed into a cramp $4^a$ and has the screw 26 sloped, as shown, to give room for turning the head 27 when it is desired to attach the machine to a table or the like, which has a rail 28 near the edge of the table. The bevel-washer 29 is pivoted in the ordinary way upon the end of the screw, but I make the back of the same with a flat side, as shown on Fig. 6, and this flat side bearing upon the face of the bracket prevents the washer from turning around. The washer is thus always in its right position for approaching the table. The machine may be further secured by screws $4^b$ when it is desired to fix the same permanently.

At the back of the knives the edges 30 are turned up, as shown on Fig. 3, so that they can be securely held in the fingers while adjusting the knives in position on the faces 6, for which purpose slots 31 are made in the knives.

To operate the machine, the upper part 23 of the mouthpiece is adjusted to allow the cake of tobacco 32 to enter freely. The disk, with its box 10, is turned by the handle 9, while the tobacco is pressed through the mouthpiece by the fingers of the operator. The final piece of the cake is cut up by introducing a fresh cake behind the same. As the tobacco is cut it falls into the box 10, wherefrom it may be removed by taking the box off the disk, in case the bayonet-joints or the screws are used, or by throwing the box back, as shown by dotted lines on Fig. 3, when the hinge 20 is employed.

By placing the mouthpiece 22 centrally in relation to the disk I am enabled to use a disk of small diameter, with the knives near the center of the disk, which arrangement results in a consequent reduction of power necessary for cutting the tobacco.

Having now particularly described and ascertained the nature of my said invention and in what manner the same is to be performed, I declare that what I claim is—

In a tobacco-cutter, the combination of a disk having knives, a handle secured to the disk, a box hinged to the handle and a spring-catch for holding the box to the disk substantially as described.

In testimony that I claim the foregoing as my invention I have signed my name in presence of two subscribing witnesses.

FREDERICK LAMBERT LORDEN.

Witnesses:
E. S. BALDWIN,
STANLEY W. JONES.